(12) United States Patent
Kim

(10) Patent No.: US 8,036,144 B2
(45) Date of Patent: Oct. 11, 2011

(54) GATEWAY SELECTION METHOD FOR WIRELESS MESH NETWORK

(75) Inventor: Hyun Jin Kim, Busan (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 208 days.

(21) Appl. No.: 12/351,081

(22) Filed: Jan. 9, 2009

(65) Prior Publication Data

US 2009/0175204 A1 Jul. 9, 2009

(30) Foreign Application Priority Data

Jan. 9, 2008 (KR) .................. 10-2008-0002585

(51) Int. Cl.
*H04L 12/28* (2006.01)
(52) U.S. Cl. .................... 370/256; 370/254; 370/255
(58) Field of Classification Search .............. None
See application file for complete search history.

(56) References Cited

U.S. PATENT DOCUMENTS

| | | | | |
|---|---|---|---|---|
| 6,374,316 B1* | 4/2002 | James et al. | ............... | 710/104 |
| 6,556,543 B1* | 4/2003 | Park et al. | ............... | 370/255 |
| 6,621,798 B1* | 9/2003 | Krishnan et al. | ............... | 370/256 |
| 6,765,881 B1* | 7/2004 | Rajakarunanayake | ........ | 370/256 |
| 7,280,481 B2* | 10/2007 | Rong | ............... | 370/238 |
| 7,643,468 B1* | 1/2010 | Arregoces et al. | ............... | 370/351 |
| 7,701,881 B1* | 4/2010 | Sankaran | ............... | 370/256 |
| 7,787,361 B2* | 8/2010 | Rahman et al. | ............... | 370/217 |
| 2003/0053422 A1* | 3/2003 | Ambe | ............... | 370/256 |
| 2004/0264379 A1* | 12/2004 | Srikrishna et al. | ............... | 370/238 |
| 2005/0152289 A1* | 7/2005 | Nagata et al. | ............... | 370/256 |
| 2005/0195795 A1* | 9/2005 | Aoki et al. | ............... | 370/351 |
| 2006/0168341 A1* | 7/2006 | Keller-Tuberg | ............... | 709/242 |
| 2006/0203745 A1* | 9/2006 | Acharya et al. | ............... | 370/254 |
| 2007/0070959 A1* | 3/2007 | Almeroth et al. | ............... | 370/338 |
| 2007/0201382 A1* | 8/2007 | Ekl et al. | ............... | 370/254 |
| 2007/0223451 A1* | 9/2007 | Ren et al. | ............... | 370/352 |
| 2007/0274228 A1* | 11/2007 | Nandagopalan et al. | ..... | 370/252 |
| 2008/0089246 A1* | 4/2008 | Ghanwani et al. | ............... | 370/256 |

* cited by examiner

*Primary Examiner* — Ayaz Sheikh
*Assistant Examiner* — Peter Chau
(74) *Attorney, Agent, or Firm* — Cha & Reiter, LLC

(57) ABSTRACT

A gateway selection method for a wireless mesh network is provided for selecting an optimal gateway includes building a spanning routing tree to a given network. Reference factors of routers are calculated regarding the network to total network capacity in association with the spanning routing tree. A router is selected which has the greatest reference factor as being an optimal gateway of the network.

14 Claims, 6 Drawing Sheets

GATEWAY SELECTION METHOD FOR WIRELESS MESH NETWORK

CLAIM OF PRIORITY

This application claims priority under 35 U.S.C. §119 from an application entitled "GATEWAY SELECTION METHOD FOR WIRELESS MESH NETWORK," filed in the Korean Intellectual Property Office on Jan. 9, 2008 and assigned Serial No. 2008-0002585, the contents of which are incorporated herein by reference in its entirety.

BACKGROUND OF THE INVENTION

1. Field of the Invention

The present invention relates to a wireless mesh network. More particularly, the present invention relates to the wireless mesh networks and the bottleneck effect at the gateway which restricts the network throughput, and ways to optimize network capacity.

2. Description of the Related Art

Wireless mesh networking (WMN) is a promising technology for providing a wireless backhaul network made of fixed multi-hop wireless routers. Typically, a wireless mesh network includes one or more wireless routers called gateways that connect the mesh network with the wired Internet. Each wireless router provides mobile nodes with wireless access service and work as a part of the wireless backhaul network.

For the reason that wireless routers constituting the wireless mesh networks are formed as fixed nodes with little change in topology, the wireless mesh networking technology is a cost-effective means for constructing a wireless ubiquitous infrastructure in fixed buildings, such as schools and hospitals. Network topology is an arrangement of elements of a network that are interconnected with each other via communication links.

The wireless mesh network is a multi-hop network similar to an Ad Hoc network such that Ad-Hoc routing protocols such Dynamic Source Routing (DSR) and Ad-Hoc On-demand Distance Vector (AODV) are used for the wireless mesh network.

Unlike the conventional routing algorithms using the number of hops as a routing metric, however, most of the mesh network routing algorithms exploit link quality and transmission rate as routing metrics. The reason for using link quality and transmission rate as routing metrics is because the routers of a mesh network are fixed at their initial positions and have to secure redundant wireless link quality for guaranteeing Quality of Service (QoS) while acting as access points (APs).

In an Ad-Hoc network in which nodes move frequently, the DSR and AODV protocols using on-demand algorithms are effective to improve the network throughput. However, the DSR and AODV protocols are likely to cause control packet overhead problems in the wireless mesh network, of which topology does not change. Furthermore, the conventional routing protocols are designed without consideration of the wireless mesh network characteristics in that all the network traffics are delivered to a gateway.

In order to solve these problems, certain spanning tree-based routing protocols have been proposed. In a spanning tree routing protocol, a spanning tree is created for connection to a gateway. However, these routing protocols do not specify that which router is to be an optimal gateway to optimize the network capacity.

In view of the network capacity, it is known that the network capacity of a wireless mesh network is in inversely proportional to a number of wireless routers. Also, the centralization of network traffic to the gateway causes bottleneck effects. Accordingly, the gateway has to have the ability to process more than bottleneck capacity to provide reliable service.

This means that the network cannot guarantee QoS to the traffic over the bottleneck capacity. Research is currently underway for solving the routing problem while optimizing the network through by performing scheduling and routing on entire links of the wireless mesh network.

One approach to solve the bottleneck effect is to configure several gateways for load balancing of the network under the assumption that a gateway is located at a specific location already. However, this method also does not propose how to select an optimal gateway for optimizing the network capacity.

In short, although it is known that the wireless mesh network causes bottleneck effects at the gateway, thus restricting the network throughput, the conventional wireless mesh network routing protocols have been designed without consideration on how to find an optimal gateway, thereby failing optimization of network capacity.

SUMMARY OF THE INVENTION

The present invention provides a gateway selection method for a wireless mesh network that permits optimizing network capacity.

Also, the present invention provides a gateway selection method for a wireless mesh network that permits finding an optimal gateway, by using a routing tree, in a given network environment with minimal polynomial time complexity regardless of network size.

Also, the present invention provides a gateway selection method for a wireless mesh network implemented with a spanning tree routing algorithm that for optimizing total network capacity in consideration of traffics between sub-networks and mobile nodes.

In accordance with an exemplary embodiment of the present invention, a gateway selection method for a wireless mesh network includes building a spanning routing tree to a given network; calculating reference factors of routers constituting the network to the total network capacity in association with the spanning routing tree; and selecting the router in which the reference factor is the greatest (largest) as an optimal gateway of the network.

In accordance with another exemplary embodiment of the present invention, a gateway selection method for a wireless mesh network includes building a routing tree to an arbitrary router as a candidate gateway in a given network; calculating sub-reference factors of routing paths from the arbitrary router to all other routers; calculating reference factors to total network capacities of network instances defined with every candidate gateway; and selecting the router, as the candidate gateway having a largest reference factor as the gateway.

BRIEF DESCRIPTION OF THE DRAWINGS

The above features and advantages of the present invention will be more apparent from the following detailed description in conjunction with the accompanying drawings, in which.

DETAILED DESCRIPTION

Exemplary embodiments of the present invention are described herein after with reference to the accompanying drawings in detail. The same reference numbers are used throughout the drawings to refer to the same or like parts. Detailed description of well-known functions and structures incorporated herein may be omitted to avoid obscuring the subject matter of the present invention.

Unless otherwise noted, the terms and phrases are to be understood according to conventional usage by those skilled in the relevant art. While the invention is shown and described with reference to certain exemplary embodiments thereof, it will be understood by those skilled in the art that various changes in form and details may be made therein without departing from the spirit and scope of the invention as defined by the appended claims.

In the following exemplary embodiment, an efficient wireless network configuration technique is proposed. Particularly, the following exemplary embodiment of the present invention focuses on how to select an optimal gateway for optimizing the network capacity of a wireless mesh network. A gateway selection method according to an exemplary embodiment of the present invention enables selecting an optimal gateway capable of optimizing total network capacity to a given network including mobile nodes using an improved spanning tree algorithm.

The spanning tree algorithm (STA) ensures a loop-free topology for a local area network (LAN) having a bridge. In general, a spanning tree permits network design to include redundant for automatic backup paths if an active link fails. Moreover, the spanning tree protocol reduces the problem of bridge loops, and/or the need to manually enable or disable backup paths. Spanning tree protocol, which is defined in IEEE 802.1D is based on the spanning tree algorithm by Radia Perlman.

The gateway selection method according to an exemplary embodiment of the present enables finding and selecting an optimal gateway that optimizes network capacity with less traffic overhead.

At first, how the position of a gateway influences to the network capacity is described with reference to FIGS. 1A and 1B.

Figure 1A:
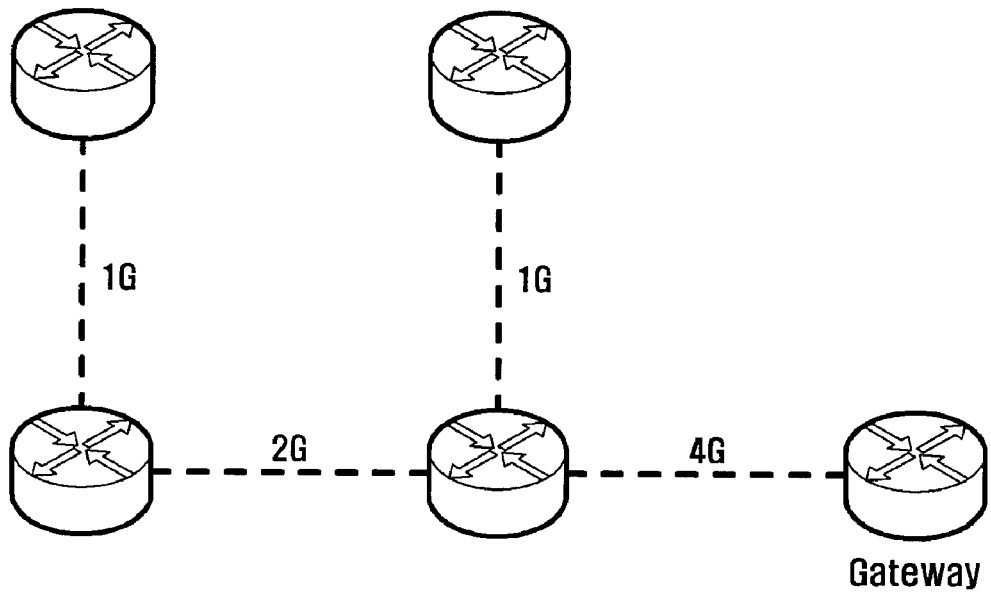
FIGS. 1A and 1B are diagrams illustrating wireless mesh networks for explaining influence of a position of gateway to network capacity.
Figure 1B:
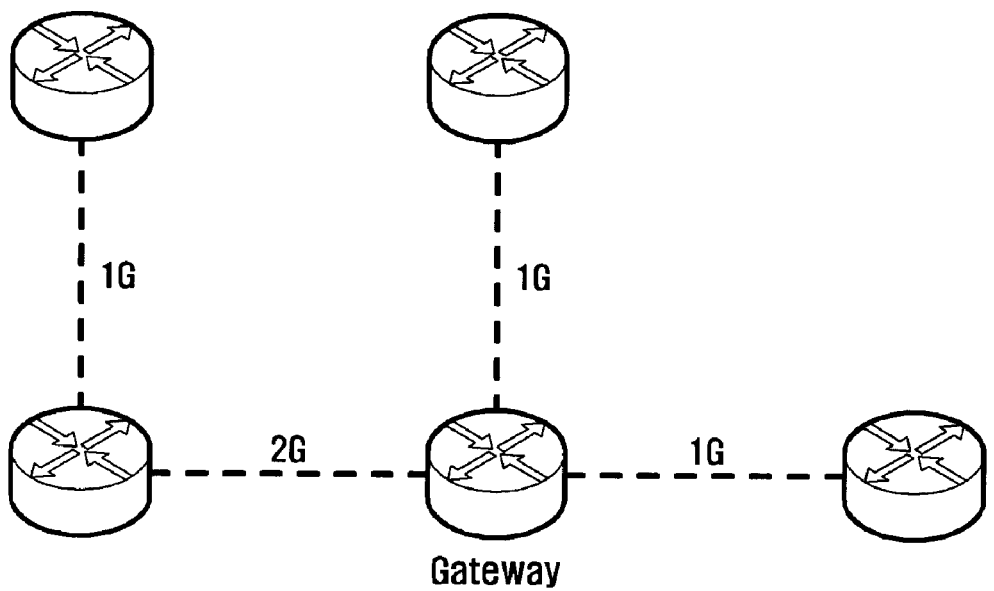

FIGS. 1A and 1B are diagrams illustrating wireless mesh networks for explaining influence of a position of gateway to network capacity.

In FIG. 1A, a router is positioned at an end link extended rightward from a center router is the Gateway, whereas the center router is the gateway in FIG. 1B.

Assuming that each router generates traffic of 1 G, the total traffic of the network of FIG. 1A becomes 8 G (1 G+2 G+1 G+4 G) by summing traffic amount on the entire links between routers, whereas the total traffic of the network of FIG. 1B becomes 5 G (1 G+2 G+1 G+1 G).

In the case of the network of FIG. 1A, each link is required to have at least 8 G of link capacity for guaranteeing QoS to all the routers. Whereas, in the case of the network of FIG. 1B, at least 5 G of link capacity is required for guaranteeing the QoS to all the routers.

Assuming that each link has the capacity of 6 G, the network of FIG. 1A does not guarantee the network QoS, but the network of FIG. 1B does. Accordingly, it is preferred to select the center router as the gateway in the give networks shown in FIG. 1B to optimize the network capacity.

As described above, according to this exemplary embodiment of the present invention, selecting a router to act as a gateway is a basic factor for determining the total network capacity in a given network. However, the gateway also should be selected in consideration of other factors such as time varying traffic amount, link quality, and network environment. Such a gateway selection based on various factors is likely cause significant overhead.

In the following description, the gateway selection method creates a routing tree and selects the optimum gateway, with which the network capacity is optimized, using the routing tree in a given wireless mesh network in polynomial time complexity regardless of network size.

Wireless mesh network topology is designed in a given environment of fixed wireless routers such that all of the wireless routers are candidate gateways. Among them, the router which optimizes the network capacity is selected as the gateway which is connected to a wired network thereby improving the network throughput.

With the basic understanding of the above-explained gateway selection principle in the mesh network, a gateway selection method for optimizing the network capacity will be described hereinafter.

In the following description, it is assumed that one wireless router is selected as the gateway and the gateway knows the positions of all other wireless routers. Also, it is assumed that the link quality is inversely proportional to the square of the distance between two wireless routers.

Figure 2:
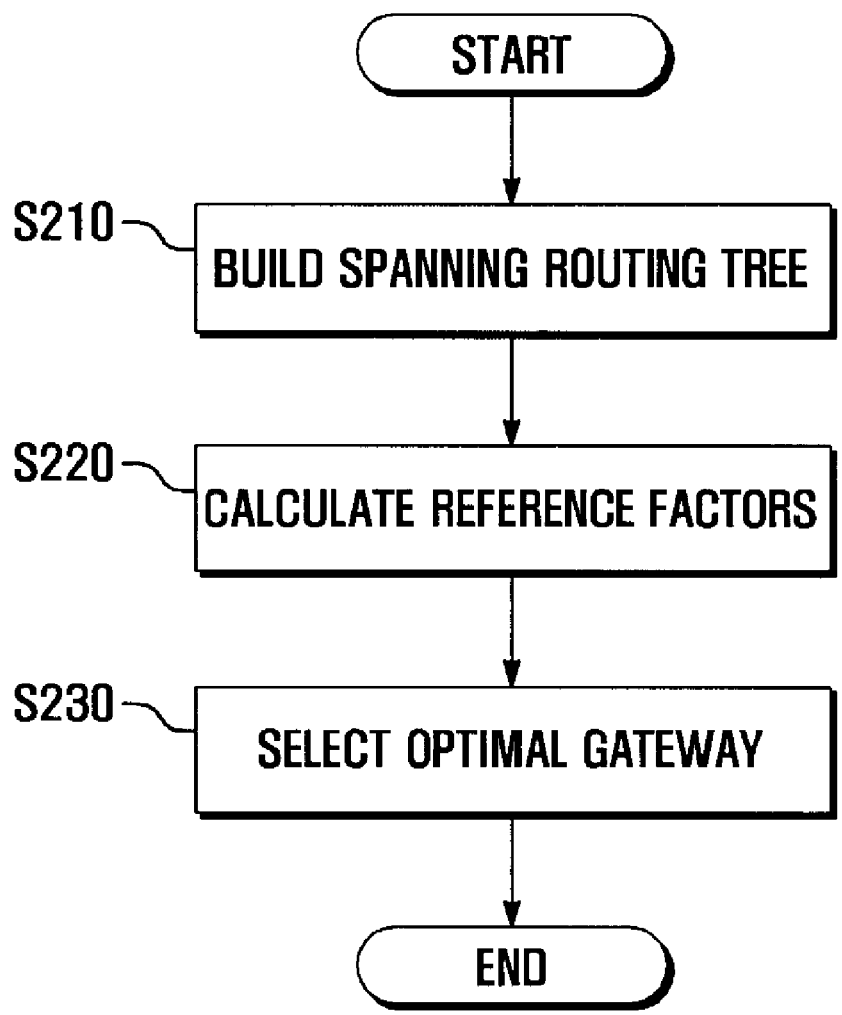
FIG. 2 is a flowchart illustrating a gateway selection method according to an exemplary embodiment of the present invention.

FIG. 2 is a flowchart illustrating exemplary steps of a gateway selection method according to an exemplary embodiment of the present invention.

Referring to FIG. 2, the exemplary gateway selection method includes the steps of building a spanning routing tree using the Dijkstra algorithm (S210), calculating a reference factor of the total network capacity (S220), and selecting an optimal gateway on the basis of the value of the reference factor (S230).

The Dijkstra algorithm is a graph search algorithm that solves the single-source shortest path problem in consideration of path cost. For a given source vertex, the Dijkstra algorithm finds the path with lowest cost (i.e. the shortest path) between that vertex and every other vertex.

Now, each steps of the gateway selection method is described in more detail.

With continued reference to FIG. 2, regarding the spanning tree building step (210), all the source and destination nodes of the wireless mesh network are gateways. When using the DSR or AODV routing protocol based on the on-demand algorithm, the routing table from the gateway to every wireless router is built in the form of a spanning tree having the gateway as the root of all the routers. Assuming that the gateway knows the fixed network environment and the positions of the plurality of routers, the DSR or AODV-based routing strategy may cause significant routing overhead.

The Dijkstra algorithm is used for building an efficient routing tree when a specific router "g" is selected as the gateway. In the Dijkstra algorithm, every link between nodes has cost. In this exemplary embodiment, the cost is a distance between the two wireless routers. The reasoning is based on the link capacity being inversely proportional to the square of distance of the link, and the spanning tree is built in order to maximize capacity of the total network capacity.

Regarding the reference factor calculation step (S220), most of the traffic in association with the spanning tree having a root router g causes the bottleneck effect to the root router. The reason is because the traffics of the routers are concentrated to the gateway. Here, the capacity of a routing path P (g→j) from the root router g to a specific router j is influenced by the link capacities of the links on the routing paths P (g→j) and hop count.

Although other factors influence the network capacity, the two factors, i.e. link capacity and hop count, are used for reducing the system complexity and simplifying the explanation.

The parameters used in the gateway selection method can be defined as following:

N=Given Wireless Mesh Network and i∈N, j∈N

P(i→j)=Path from router i to router j $E_{P(i \to j)}$=Set of Links on P(i→j) and e∈$E_{P(i \to j)}$ d(e)=Length of Link e R=Transmission Range of a router $H_{P(i \to j)}$=Hop count of P(i→j)

On the basis of the above definitions, the reference factor which indicates the efficiency of a routing path is calculated as follows:

$$\Phi_{P(g \to j)} = \frac{1}{\sum_{All\ e \in E_{P(g \to j)}} \left(\frac{d(e)}{R}\right)^2} \alpha + \frac{1}{(H_{P(g \to j)})^2} \beta \quad (1)$$

where $(\alpha + \beta = 1)$ where, p(g→j) denotes a routing path from router g to router j, $\Phi_{P(g \to j)}$ denotes a reference factor indicating the efficiency of the routing path from router g to router j, $E_{P(g \to j)}$ denotes a set of links on the routing path p(g→j), R denotes a transmission range of a router, d(e) denotes a length of a link e, and $H_{P(g \to j)}$ denotes a hop count of routing path p(g→j).

After calculating the sub-reference factors of all the routers to the router g using the equation (1), a reference factor of the total network capacity of the network N(g) having the router "g" as the gateway is obtained by summing the sub-reference factors. The reference factor to the total network capacity of network N(g) is calculated as follows:

$$\Phi_{N(g)} = \sum_{All\ j \in N} \Phi_{P(g \to j)} \quad (2)$$

where, N(g) denotes a network operating with a router "g" as the gateway, $\Phi_{N(g)}$ denotes the reference factor to the total network capacity of network N(g).

In a case of designing a small size mesh network with less than 2~3 hops (e.g. for a single floor or a single room of a building), it is preferred to set α of equation (1) to a value close to 1. In a case of designing a large size mesh network with more than 2~3 hops (e.g. for a building, a campus, a general hospital, or a company), it is preferred to set β to a value close to 1.

One reason in support of setting α to a value close to 1 in the small network is to give weight to the link capacity because the link capacity is more influential than the length of the routing path to the network performance. In the case of a large network, whereas the increase of hop count causes inter-link interference as well as self-interference of the links on the routing path, and thus it is preferred to give weight to the hop count.

In equations 1 and 2, the reference factor Φ is not an absolute value but a relative value to determine which routing path is preferable to improve the network performance.

Regarding optimal gateway selection step (S230), all the routers of the given wireless mesh network can be the "g" gateway. Accordingly, the reference factor to the performance of the network configured, when each router is selected as the gateway, can be obtained using equation (2). Among the routers, the one of which reference factor is the greatest is selected as the gateway. This can be expressed by the following equation:

$$\text{Calculate } \Phi_{N(i)} = \sum_{All\ j \in N} \Phi_{P(i \to j)} \text{ for all } i \in N \quad (3)$$

i can be Gateway of given WMN where $\Phi_{N(i)}$ is max.

The gateway selection step (S230) of FIG. 2 is described in more detail with reference to FIGS. 3, 4A, and 4B.

Figure 3:
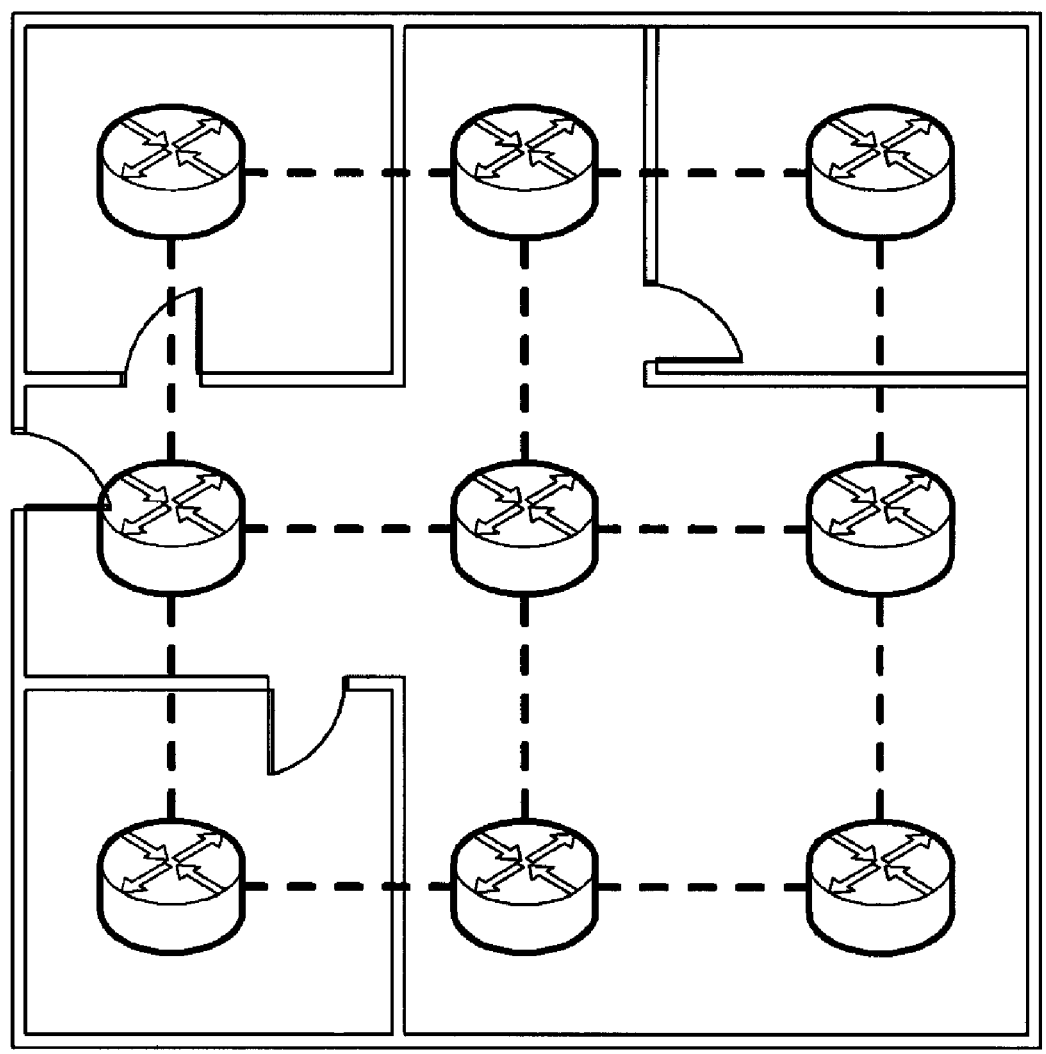
FIG. 3 is a diagram illustrating a configuration of a small size wireless network according to an exemplary embodiment of the present invention.
Figure 4A:
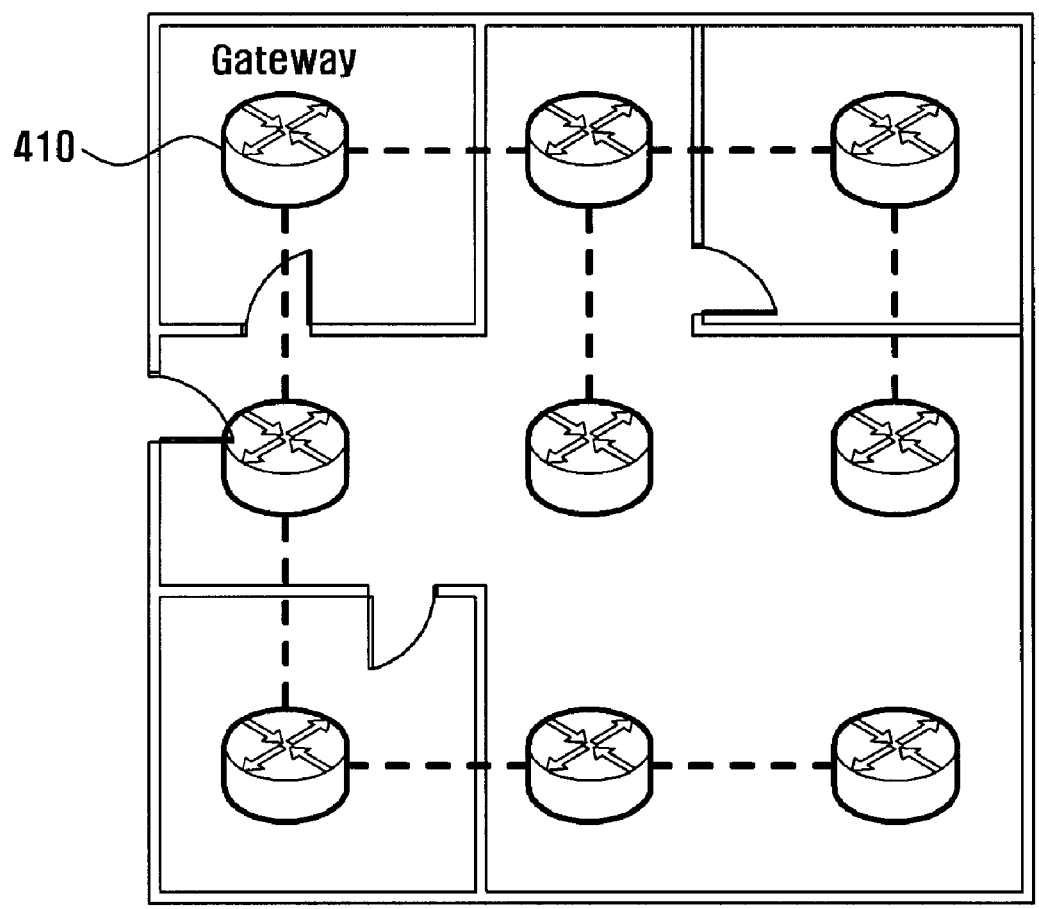
FIGS. 4A and 4B are diagrams illustrating how to select a gateway in the wireless mesh network of FIG. 3.
Figure 4B:
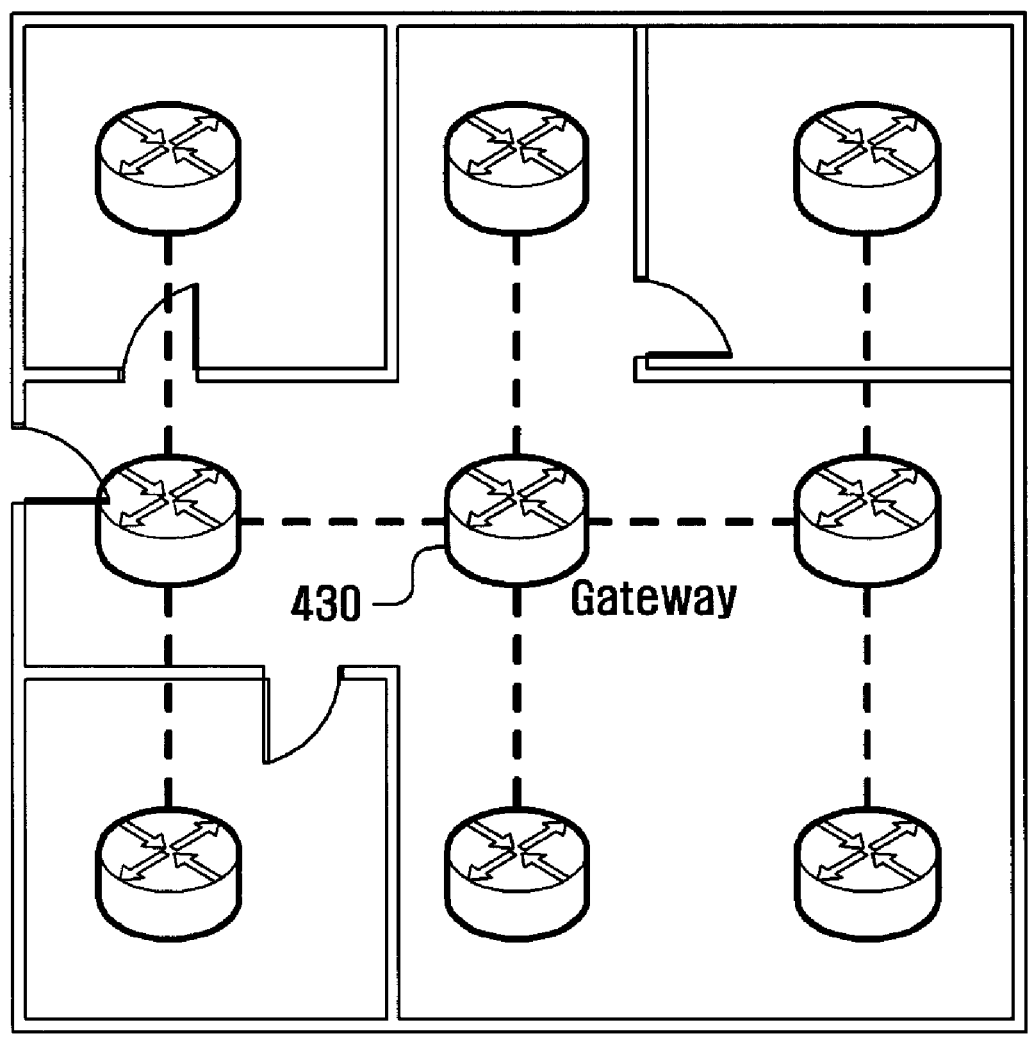

FIG. 3 is a diagram illustrating a configuration of a small size wireless network according to an exemplary embodiment of the present invention, and FIGS. 4A and 4B are diagrams illustrating how to select a gateway in the wireless mesh network of FIG. 3.

As shown in FIG. 3, 9 wireless routers are deployed in a company. Here, each link is designed to be identical with the transmission range and the network is configured in a grid topology.

In the wireless mesh network configured in FIG. 3, how to select a wireless router as the optimal gateway is described with reference to FIGS. 4A and 4B.

As shown in FIGS. 4A and 4B, the router 410 positioned at the left top corner of the diagram is selected as the gateway in FIG. 4A, and the router 430 positioned at the center of the diagram is selected as the gateway in FIG. 4B. The routers are connected with each other on the basis of the spanning tree built shown in FIG. 3 in accordance with step 210 of FIG. 2.

The reference factor calculation step S230 of FIG. 2 can be used to obtain the reference factors in association with the gateways 410 and 430 shown in FIGS. 4A and 4B, respectively. That is, the reference factors to the routers 410 and 430 selected as the gateway in FIGS. 4A and 4B are calculated as the following equations 4 and 5 herein below. Here, it is assumed that the links between routers are identical with each other, the length of the link is identical with the transmission range, i.e. d(e)=R. The reference factors of the wireless mesh networks of FIGS. 4A and 4B are obtained as following:

$$\Phi_N = \frac{1}{16} (\alpha = 1), \Phi_N = \frac{1}{48} (\beta = 1) \quad (4)$$

-continued $$\Phi_N = \frac{1}{12}(\alpha = 1), \Phi_N = \frac{1}{20}(\beta = 1) \quad (5)$$

As shown in equations (4) and (5), the wireless mesh network of FIG. 4B configured with the gateway 430 is superior to the network of FIG. 4A configured with the gateway 410 in network performance.

An algorithm for selecting a gateway which optimizes the network capacity in a wireless mesh network is described hereinafter. However, the present invention is not limited to the exemplary embodiment described herein, but can be achieved in other exemplary embodiments with various modifications.

Figure 5:
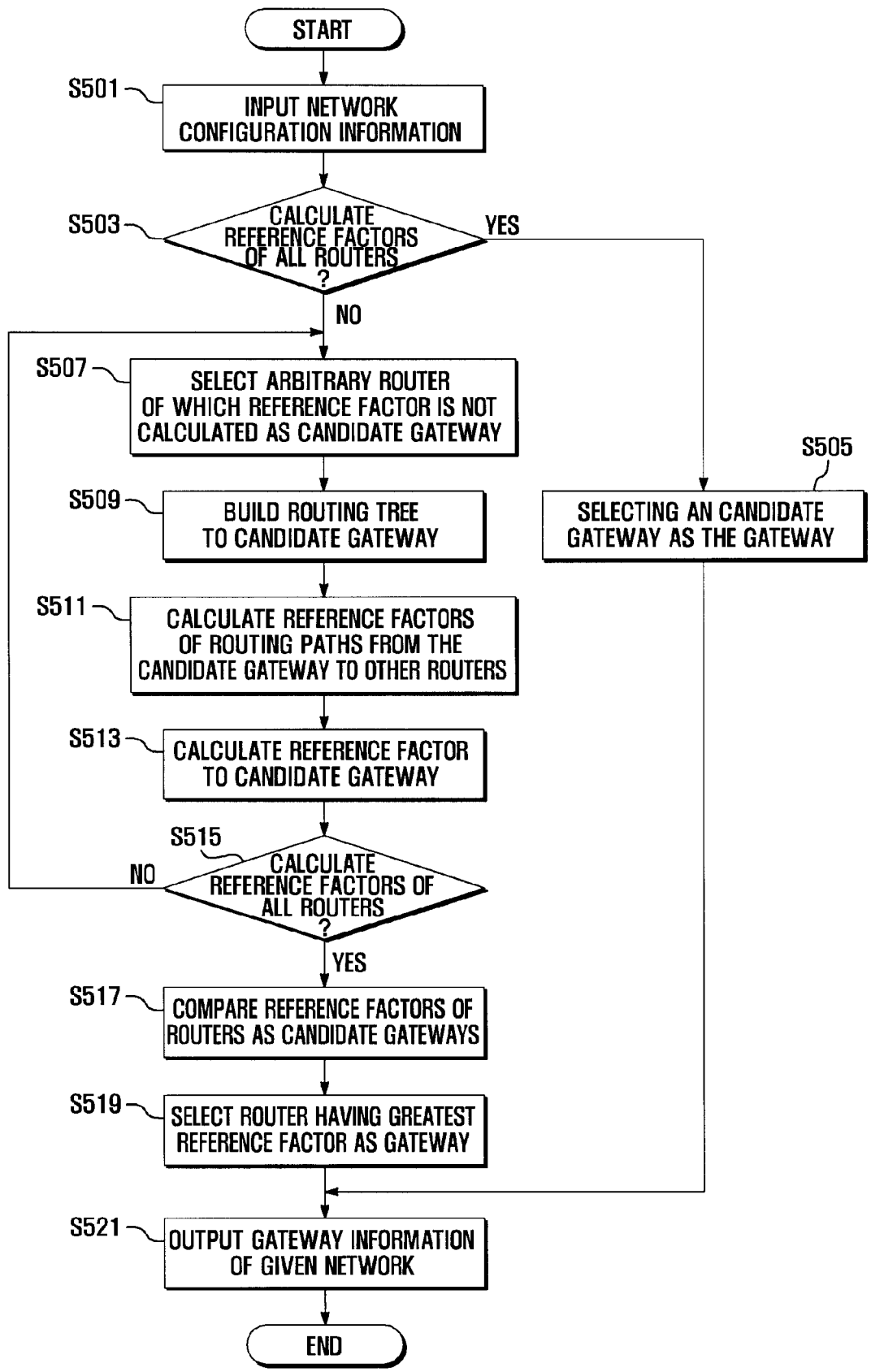
FIG. 5 is a flowchart illustrating a gateway selection method according to another exemplary embodiment of the present invention.

FIG. 5 is a flowchart illustrating exemplary steps of a gateway selection method according to another exemplary embodiment of the present invention.

Referring to FIG. 5, if network configuration information is input (S501), the system determines whether the reference factors to all the routers constituting a wireless mesh network are calculated/obtained (S503). The reference factors are calculated using equation (2). Although the reference factors inspection step (S503) is depicted in FIG. 5, this step can be omitted.

If it is determined that the reference factors to all the routers are obtained, the system then selects one of routers as a candidate for being the gateway router on the basis of the reference factors (S505) and outputs the information on the gateway of the network (S521).

On the other hand, if the reference factors to all the routers are not obtained, the system selects the routers to which the reference factors are not calculated as candidate gateways (S507).

Next, at step (S509), the system builds routing trees to the networks defined with every candidate gateway.

Subsequently, the system calculates reference factors indicating the efficiencies of routing paths to a specific router from all other routers using equation (1) (S511) and then calculates the reference factor to the total network capacity using equation (2) (S513). That is, the system sums the reference factors to all the routers calculated using equation (1) and obtains the reference factor to the total network capacity of the network configured with a candidate gateway.

After calculating the reference factors to the total network capacity of the network configured with the candidate gateway, the system determines whether the reference factors to all the routers constituting the network (S515) are calculated. That is, the system determines whether there is any candidate gateway to which the above process has not been applied.

If it is determined that another gateway to which the above process can be applied, the system repeats the above process to the candidate gateway.

If it is determined that the reference factors to all the candidate gateways are calculated, the system then compares the reference factors with each other (S517), and then selects the candidate gateway of which reference factor is the greatest (largest) as the optimal gateway (S519). Next, the system outputs the network information configured with the optimal gateway (S521).

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

As described above, the gateway selection method for a wireless mesh network according to the present invention can be applied to wireless network design and simulation tools for implementing a wireless mesh network efficiently. The wireless mesh network should be implemented through the planning and design on the wired infrastructure network rather than the finger-counting implementation method. Accordingly, the gateway network selection method of the present invention can be used at the planning stages for designing a wireless mesh network with improved QoS and capacity, especially when designing a wireless backhaul network in a building.

Also, the gateway selection method for a wireless mesh network according to the present invention permits finding an optimal gateway in a wireless mesh network environment with polynomial time complexity, regardless of the network size. The gateway selection method enables finding a gateway that is capable of optimizing the total network capacity especially when the wireless mesh network is implemented with a spanning tree-based routing algorithm.

Also, the gateway selection method for a wireless mesh network can provided as a simulation tool for testing the implemented network and a network control system (system administrator, computer, and other control device) for improving the network performance.

Also, the gateway selection method for a wireless mesh network according to the present enables designing a wireless mesh network that allows for maximizing utilization through the interoperability between the wireless mesh network implemented with an optimal gateway and outside network.

What is claimed is:

1. A gateway selection method, for a wireless mesh network, said gateway selection method comprising:
    (a) building, by a computer, a spanning routing tree to a mesh network;
    (b) calculating, by the computer, reference factors which indicate an efficiency of a routing path of a select number of a plurality of routers within the mesh network to a total network capacity in association with the spanning routing tree, the reference factors being determined as follows:

$$\Phi_{P(g \to j)} = \frac{1}{\sum\limits_{All\ e \in E_{p(g \to j)}} \left(\frac{d(e)}{R}\right)^2} \alpha + \frac{1}{(H_{P(g \to j)})^2}\beta$$

where $(\alpha + \beta = 1)$ where, $p(g \to j)$ denotes a routing path from router g to router j,
$\Phi_{P(g \to j)}$ denotes a reference factor indicating the efficiency of the routing path from router g to router j,
$E_{P(g \to j)}$ denotes a set of links on the routing path $p(g \to j)$,
R denotes a transmission range of a router, d(e) denotes a length of a link e, and
$H_{P(g \to j)}$ denotes a hop count of routing path $p(g \to j)$;
    (c) selecting, by the computer, one of the plurality of routers as an optimal gateway, said selected router having a highest reference factor of the reference factors calculated in step (b).

2. The gateway selection method of claim 1, wherein the reference factors in step (b) are calculated on a basis of link capacities of all links between routers on a routing path and a hop count from a source router to a destination router.

3. The gateway selection method of claim 2, wherein calculating the reference factors in step (b) comprises:
   calculating sub-reference factors of all routers in the mesh network to an arbitrary router; and
   summing the sub-reference factors.

4. The gateway selection method of claim 3, wherein the reference factors are obtained to all network instances defined with a plurality of respective candidate gateways, the respective candidate gateways being the routers.

5. The gateway selection method of claim 2, wherein selecting an optimal gateway comprises:
   comparing reference factors calculated on a basis of the link capacities and hop counts of all routing paths from the source router to the destination router.

6. The gateway selection method of claim 5, wherein selecting an optimal gateway comprises:
   comparing reference factors calculated on the basis of path capacities and hop counts of all the routing paths from the source router to the destination router.

7. The gateway selection method of claim 1, wherein the spanning routing tree is built using a Dijkstra algorithm.

8. The gateway selection method according to claim 1, wherein a reference factor to the total network capacity of a network N(g) is calculated as follows:

$$\Phi_{N(g)} = \sum_{All\ j \in N} \Phi_{P(g \to j)}$$

where, N(g) denotes a network operating with a router "g" as a potential optimal gateway,
$\Phi_{N(g)}$ denotes the reference factor to the total network capacity of network N(g).

9. A gateway selection method, for a wireless mesh network, said gateway selection method comprising:
   (a) building, by a computer, a routing tree to an arbitrary router as a candidate gateway in the wireless mesh network;
   (b) calculating, by the computer, sub-reference factors of routing paths from the arbitrary router to all other routers in the wireless mesh network, the sub-reference factors being determined as;

$$\Phi_{P(g \to j)} = \frac{1}{\sum_{All\ e \in E_{p(g \to j)}} \left(\frac{d(e)}{R}\right)^2} \alpha + \frac{1}{(H_{P(g \to j)})^2} \beta$$

where $(\alpha + \beta = 1)$ where, p(g→j) denotes a routing path from router g to router j, $\Phi_{P(g \to j)}$ denotes a reference factor indicating the efficiency of the routing path from router g to router j,
$E_{P(g \to j)}$ denotes a set of links on the routing path p(g→j),
R denotes a transmission range of a router, d(e) denotes a length of a link e, and
$H_{P(g \to j)}$ denotes a hop count of routing path p(g→j);
   (c) calculating, by the computer, reference factors which indicate an efficiency of a routing path to total network capacities of network instances defined with every candidate gateway based on the sub-reference factors; and
   (d) selecting, by the computer, a candidate gateway having a highest reference factor as a gateway for the wireless mesh network.

10. The gateway selection method of claim 9, wherein the sub-reference factors are calculated on the basis of link capacities of routing paths and hop counts from the arbitrary router to all other routers in the wireless mesh network.

11. The gateway selection method of claim 9, wherein calculating reference factors comprises:
   (i) calculating sub-reference factors of all other routers in the wireless mesh network to the arbitrary router; and
   (ii) obtaining a reference factor by summing the sub-reference factors of all other routers in the wireless mesh network to the arbitrary router.

12. The gateway selection method of claim 9, wherein the routing tree is built using a Dijkstra algorithm.

13. The gateway selection method of claim 9, further comprising:
   determining whether the reference factors of all of the routers in the wireless mesh network have been obtained;
   calculating, if the reference factors of all of the routers in the wireless mesh network have not been obtained, a reference factor of a router not having a corresponding reference factor calculated; and
   comparing, if the reference factors of all the routers have been obtained, the reference factors with each other to determine a router having a highest reference factor.

14. The gateway selection method according to claim 9, wherein a reference factor to the total network capacity of a network N(g) is calculated as follows:

$$\Phi_{N(g)} = \sum_{All\ j \in N} \Phi_{P(g \to j)}$$

where, N(g) denotes a network operating with a router "g" as a potential optimal gateway,
$\Phi_{N(g)}$ denotes the reference factor to the total network capacity of network N(g).

* * * * *

UNITED STATES PATENT AND TRADEMARK OFFICE
CERTIFICATE OF CORRECTION

| | |
|---|---|
| PATENT NO. | : 8,036,144 B2 |
| APPLICATION NO. | : 12/351081 |
| DATED | : October 11, 2011 |
| INVENTOR(S) | : Hyun Jin Kim |

Page 1 of 1

It is certified that error appears in the above-identified patent and that said Letters Patent is hereby corrected as shown below:

Column 9, Claim 8, Line 23 should read as follows
--...factor to a total network capacity...--

Signed and Sealed this
Thirty-first Day of July, 2012

David J. Kappos
*Director of the United States Patent and Trademark Office*